(12) United States Patent
Zhang

(10) Patent No.: US 10,170,026 B2
(45) Date of Patent: Jan. 1, 2019

(54) DETECTION CIRCUITS AND DETECTION METHODS OF LIQUID CRYSTAL PANELS

(71) Applicant: Shenzhen China Star Optoelectronics Technology Co., Ltd., Shenzhen, Guangdong (CN)

(72) Inventor: Xianming Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 164 days.

(21) Appl. No.: 15/128,211

(22) PCT Filed: Aug. 3, 2016

(86) PCT No.: PCT/CN2016/093129
§ 371 (c)(1),
(2) Date: Sep. 22, 2016

(87) PCT Pub. No.: WO2017/210985
PCT Pub. Date: Dec. 14, 2017

(65) Prior Publication Data
US 2018/0218655 A1 Aug. 2, 2018

(30) Foreign Application Priority Data
Jun. 6, 2016 (CN) .......................... 2016 1 0394188

(51) Int. Cl.
*G09G 3/00* (2006.01)
*G02F 1/13* (2006.01)
*G09G 3/36* (2006.01)

(52) U.S. Cl.
CPC ........... *G09G 3/006* (2013.01); *G02F 1/1309* (2013.01); *G09G 3/00* (2013.01); *G09G 3/36* (2013.01);
(Continued)

(58) Field of Classification Search
CPC .. G09G 3/006; G09G 3/36; G09G 2320/0626; G09G 2360/14; G09G 3/00;
(Continued)

(56) References Cited

U.S. PATENT DOCUMENTS 4,376,909 A * 3/1983 Tagami ................ B60Q 1/1423
315/82
5,374,854 A * 12/1994 Chen .................. H05B 37/0227
307/116
(Continued)

FOREIGN PATENT DOCUMENTS

CN 1680999 A 10/2005
CN 101290762 A 10/2008
(Continued)

OTHER PUBLICATIONS

Translation of CN202720868, Feb. 6, 2013 (Year: 2013).*

*Primary Examiner* — Dmitriy Bolotin
(74) *Attorney, Agent, or Firm* — Andrew C. Cheng

(57) ABSTRACT

The present disclosure relates to a detection circuit and a detection method of liquid crystal panels. The detection circuit includes at least one optical sensor configured to detect a brightness of the liquid crystal panel, and to convert the detected brightness into a first voltage, an operational amplifier configured to amplify the first voltage according to a predetermined ratio to generate a second voltage, and a comparison circuit configured to compare the second voltage generated by the operational amplifier with a plurality of reference voltages to generate control signals for shutting down a power of the liquid crystal panel. With such configuration, the power of the liquid crystal panel may be shut down in time when the liquid crystal panel operates abnormally, which avoids more serious issue that may occur.

8 Claims, 2 Drawing Sheets

(52) U.S. Cl.
CPC ... *G09G 3/3696* (2013.01); *G09G 2320/0626* (2013.01); *G09G 2330/027* (2013.01); *G09G 2360/14* (2013.01)

(58) Field of Classification Search
CPC ............ G09G 3/3696; G09G 2330/027; G02F 1/1309
See application file for complete search history.

(56) References Cited

U.S. PATENT DOCUMENTS

| | | | | |
|---|---|---|---|---|
| 5,850,205 | A * | 12/1998 | Blouin | G09G 3/3406 345/102 |
| 8,436,794 | B2 * | 5/2013 | Park | G02F 1/1309 345/204 |
| 2003/0231161 | A1 * | 12/2003 | Yamaguchi | G09G 3/3406 345/102 |
| 2006/0055690 | A1 * | 3/2006 | Hashidume | G02F 1/13318 345/207 |
| 2007/0046619 | A1 * | 3/2007 | Sano | G09G 3/3406 345/102 |
| 2008/0158121 | A1 | 7/2008 | Liu | |
| 2009/0122039 | A1 * | 5/2009 | Katoh | G02F 1/136227 345/207 |
| 2009/0135115 | A1 * | 5/2009 | Sakamoto | G02F 1/1336 345/84 |
| 2010/0149209 | A1 * | 6/2010 | Nose | G09G 3/3629 345/618 |

FOREIGN PATENT DOCUMENTS

| | | |
|---|---|---|
| CN | 101399009 A | 4/2009 |
| CN | 202720868 U | 2/2013 |
| CN | 104266754 A | 1/2015 |
| CN | 105548727 A | 5/2016 |
| KR | 20100024794 A | 3/2010 |

\* cited by examiner

DETECTION CIRCUITS AND DETECTION METHODS OF LIQUID CRYSTAL PANELS

BACKGROUND OF THE INVENTION

1. Field of the Invention

The present disclosure relates to display technology, and more particularly to a detection circuit and a detection method of liquid crystal panels.

2. Discussion of the Related Art

With the development of liquid crystal display technology, more and more terminal devices, such as tablets, smart phones, and smart TVs, may adopt the liquid crystal panels, including TN-LCD, VA-LCD, and IPS-LCD, as the main display panel.

Currently, the operations of the liquid crystal panel are observed by human eyes. For instance, when a black image is shown, the liquid crystal panel may be determined as abnormal by human eyes. However, during the operations of the liquid crystal panel may exist the issues, such as color shift and insufficient brightness, caused by Gamma drifting, data error, or insufficient driving voltage. As these issues cannot be detected by human eyes in time, the user experience may be affected. In addition, more serious issues may come out, like the liquid crystal panel may be burn out, if such issues have not been cured in time.

Thus, it is obvious that some issues of the liquid crystal panel may not be easily detected by human eyes.

SUMMARY

The present disclosure relates to a detection circuit and a detection method of liquid crystal panels to overcome the above-mentioned problem, such as that the operations of the liquid crystal panel may not be easily detected by human eyes in time.

In one aspect, a detection circuit of liquid crystal panels includes: at least one optical sensor configured to detect a brightness of the liquid crystal panel, and to convert the detected brightness into a first voltage; an operational amplifier configured to amplify the first voltage according to a predetermined ratio to generate a second voltage; and a comparison circuit configured to compare the second voltage generated by the operational amplifier with a plurality of reference voltages to generate control signals for shutting down a power of the liquid crystal panel.

Wherein the comparison circuit includes: a first comparator configured to compare the second voltage with the first reference voltage; a first switch being turned on or off in accordance with first control signals outputted by the first comparator; a second comparator configured to compare the second voltage with the second reference voltage; a second switch being turned on or off in accordance with second control signals outputted by the second comparator; and wherein the second reference voltage is greater than the first reference voltage, and a power of the liquid crystal panel is turned off when the first switch is turned on by the first control signals or when the second switch is turned on by the second control signals.

Wherein the comparison circuit further includes: a third comparator compares the second voltage with the third reference voltage; a fourth comparator compares the second voltage with the fourth reference voltage; an OR circuit executes or calculates the third control signals outputted by the third comparator and the fourth control signals outputted by the fourth comparator to generate fifth control signals; a third switch being turned on or off by the fifth control signals outputted by the OR circuit; and wherein the fourth reference voltage is greater than the third reference voltage, and when the fifth control signals turns on the third switch, the power of the liquid crystal panel is turned off when the third switch is turned on.

Wherein when the second reference voltage is greater than the first reference voltage, the first switch is turned on by the first control signals outputted by the first comparator, and when the second reference voltage is smaller than the first reference voltage, the first switch is turned off by the first control signals outputted by the first comparator; and when the second reference voltage is smaller than the second reference voltage, the second switch is turned on by the second control signals outputted by the second comparator, and when the second reference voltage is greater than the second reference voltage, the second switch is turned off by the second control signals outputted by the second comparator.

Wherein when the second reference voltage is greater than the third reference voltage, the third switch is turned on by the third control signals outputted by the third comparator, and when the second reference voltage is smaller than the third reference voltage, the third switch is turned off by the third control signals outputted by the third comparator; and when the second reference voltage is smaller than the fourth reference voltage, the third switch is turned on by the fourth control signals outputted by the fourth comparator, and when the second reference voltage is greater than the fourth reference voltage, the third switch is turned off by the fourth control signals outputted by the fourth comparator.

In another aspect, a detection method of liquid crystal panels includes: detecting a brightness of the liquid crystal panel and converting the detected brightness into a first voltage by at least one optical sensor; amplifying the first voltage according to a predetermined ratio to generate a second voltage by an operational amplifier; and comparing the second voltage generated by the operational amplifier with a plurality of reference voltages by a comparison circuit to generate control signals turning off a power of the liquid crystal panel.

Wherein the step of comparing the second voltage generated by the operational amplifier with a plurality of reference voltages by a comparison circuit to generate control signals turning off a power of the liquid crystal panel further includes: comparing the second voltage with a first reference voltage, and turning on or off a first switch by first control signals outputted by a first comparator; comparing the second voltage with a second reference voltage, and turning on or off a second switch by second control signals outputted by a second comparator; and wherein the second reference voltage is greater than the first reference voltage, and the power of the liquid crystal panel is turned off when the first switch is turned on by the first control signals or when the second switch is turned on by the second control signals.

Wherein the step of comparing the second voltage generated by the operational amplifier with a plurality of reference voltages by a comparison circuit to generate control signals turning off a power of the liquid crystal panel further includes: comparing the second voltage with a third reference voltage by a third comparator; comparing the second voltage with a fourth reference voltage by a fourth comparator; executing or calculating third control signals outputted by the third comparator and fourth control signals outputted by the fourth comparator to generate fifth control signals by an OR circuit; turning off a third switch by fifth control signals outputted by the OR circuit; and wherein the fourth reference voltage is greater than the third reference voltage, and when the fifth control signals turns on the third switch, the power of the liquid crystal panel is turned off when the third switch is turned on.

Wherein when the second reference voltage is greater than the first reference voltage, the first switch is turned on by the first control signals outputted by the first comparator, and when the second reference voltage is smaller than the first reference voltage, the first switch is turned off by the first control signals outputted by the first comparator; and when the second reference voltage is smaller than the second reference voltage, the second switch is turned on by the second control signals outputted by the second comparator, and when the second reference voltage is greater than the second reference voltage, the second switch is turned off by the second control signals outputted by the second comparator.

Wherein when the second reference voltage is greater than the third reference voltage, the third switch is turned on by the third control signals outputted by the third comparator, and when the second reference voltage is smaller than the third reference voltage, the third switch is turned off by the third control signals outputted by the third comparator; and when the second reference voltage is smaller than the fourth reference voltage, the third switch is turned on by the fourth control signals outputted by the fourth comparator, and when the second reference voltage is greater than the fourth reference voltage, the third switch is turned off by the fourth control signals outputted by the fourth comparator.

In view of the above, the problems of the liquid crystal panel may be detected in time. When the problem is detected, the power of the liquid crystal panel may be shut down, which effectively avoids serious problem.

DETAILED DESCRIPTION OF THE EMBODIMENTS

Embodiments of the invention will now be described more fully hereinafter with reference to the accompanying drawings, in which embodiments of the invention are shown.

Figure 1:
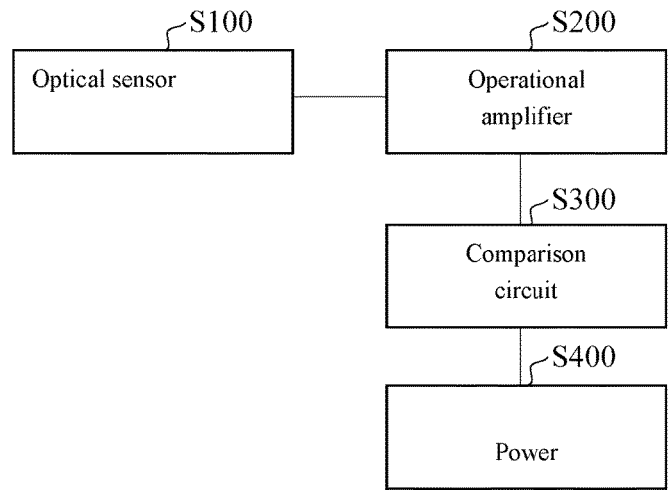
FIG. 1 is a schematic view showing the structure of the liquid crystal panel in accordance with one embodiment.

FIG. 1 is a schematic view showing the structure of the liquid crystal panel in accordance with one embodiment.

As shown in FIG. 1, the detection circuit of the liquid crystal panel includes at least one optical sensor 100, an operational amplifier 200, and a comparison circuit 300.

Specifically, each of the optical sensors 100 is configured for detecting a brightness of the liquid crystal panel, and for converting the detected brightness into a first voltage. Here, the optical sensor 100 is configured to be within a border of the liquid crystal panel. Preferably, four optical sensors 100 are hidden within four corners of the liquid crystal panel. Specifically, each of the optical sensors 100 is capable of converting the detected brightness of the liquid crystal panel, during its operations, into the first voltage, and then outputs the first voltage to the operational amplifier 200.

The operational amplifier 200 is configured to amplify the first voltage according to a predetermined ratio to generate a second voltage. In one example, the operational amplifier is a circuit unit capable of amplifying for first voltage at high magnification so as to generate the second voltage.

The comparison circuit 300 is configured to compare the second voltage generated by the operational amplifier 200 with a plurality of reference voltages to generate shutdown signals for shutting down a power 400 of the liquid crystal panel.

Specifically, when the liquid crystal panel operates abnormally, the operational voltage of the liquid crystal panel may be abnormal. Thus, the operations of the liquid crystal panel may be detected by comparing the current operational voltage of the liquid crystal panel with the predetermined voltage.

The process regarding how the second voltage is compared with the reference voltages to generate the shutdown signals will be described hereinafter.

Figure 2:
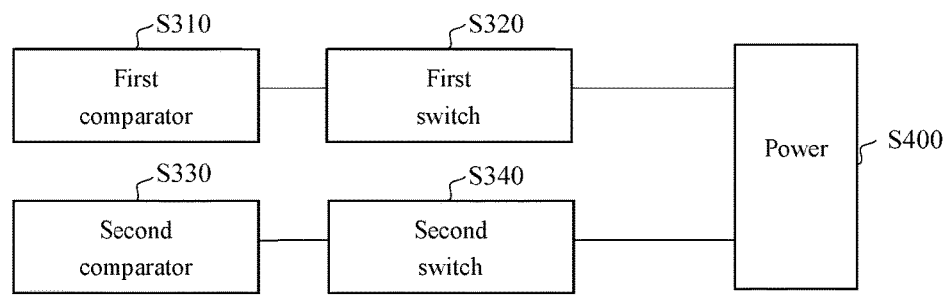
FIG. 2 is a schematic view showing one example of the comparison circuit of the detection circuit of FIG. 1.

FIG. 2 is a schematic view showing one example of the comparison circuit 300 of the detection circuit of FIG. 1.

As shown in FIG. 2, the comparison circuit 300 includes a first comparator 310, a first switch 320, a second comparator 330, and a second switch 340.

In one example, the first comparator 310 is configured to compare the second voltage with the first reference voltage, and the second comparator 330 is configured to compare the second voltage with the second reference voltage.

The first switch 320 may be turned on or off in accordance with the first control signals outputted by the first comparator 310, and the second switch 340 may be turned on or off in accordance with the second control signals outputted by the second comparator 330. Here, the first switch 320 or the second switch 340 may be NMOS transistor or PMOS transistor.

The second reference voltage is greater than the first reference voltage. In addition, the power 400 of the liquid crystal panel is turned off when the first switch 320 or the second switch 340 is turned on by the first control signals or the second control signals.

Specifically, when the second voltage is greater than the first reference voltage, the first comparator 310 outputs the first control signals to turn on the first switch 320. Specifically, when the second voltage is smaller than the first reference voltage, the first comparator 310 outputs the first control signals to turn off the first switch 320. Specifically, when the second voltage is smaller than the second reference voltage, the second comparator 330 outputs the second control signals to turn on the second switch 340. When the second voltage is greater than the second reference voltage, the second comparator 330 outputs the second control signals to turn off the second switch 340. That is, when one of the first switch 320 and the second switch 340 is turned on, enable signals of the switches of the liquid crystal panel may be grounded so as to turn off the power 400 of the liquid crystal panel.

Figure 3:
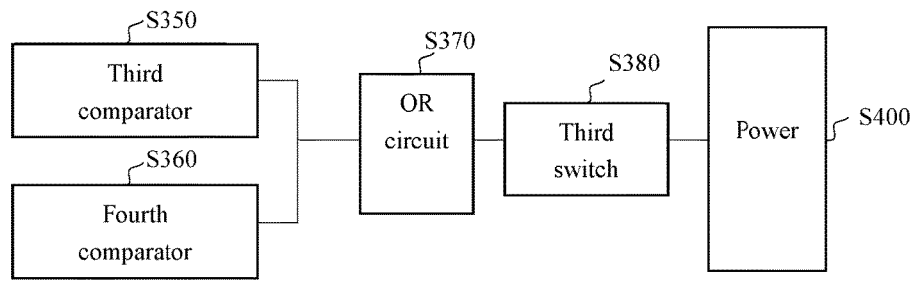
FIG. 3 is a schematic view showing another example of the comparison circuit of the detection circuit of FIG. 1.

FIG. 3 is a schematic view showing another example of the comparison circuit of the detection circuit 300 of FIG. 1.

As shown in FIG. 3, the comparison circuit 300 includes a third comparator 350, a fourth comparator 360, an OR circuit 370, and a third switch 380.

In one example, the third comparator 350 may compare the second voltage with the third reference voltage, and the fourth comparator 360 may compare the second voltage with the fourth reference voltage. The OR circuit 370 executes or calculates the third control signals outputted by the third comparator 350 and the fourth control signals outputted by the fourth comparator 360 to generate fifth control signals. Here, the OR circuit 370 relates to an unit circuit for executing basic logic calculation. The third switch 380 may be turned on or off by the fifth control signals outputted by the OR circuit 370. The third switch 380 may be the field effect transistors such as NMOS transistor or PMOS transistor.

The fourth reference voltage is greater than the third reference voltage. When the fifth control signals turns on the third switch 380, the power 400 of the liquid crystal panel may be turned off when the third switch 380 is turned on.

Specifically, when the second voltage is greater than the third reference voltage, the third control signals outputted by the third comparator 350 turns on the third switch 380. Specifically, when the second voltage is smaller than the third reference voltage, the third control signals outputted by the third comparator 350 turns off the third switch 380. When the second voltage is smaller than the fourth reference voltage, the fourth control signals outputted by the fourth comparator turns on the third switch 380. When the second voltage is greater than the fourth reference voltage, the fourth control signals outputted by the fourth comparator 360 turns off the third switch 380. That is, when one of the third control signals and the fourth control signals turns on the OR circuit 370, the OR circuit 370 generates the fifth control signals to turn on the third switch 380. As such, the enable signals of the switches of the liquid crystal panel may be grounded to shut down the power 400 of the liquid crystal panel.

Figure 4:
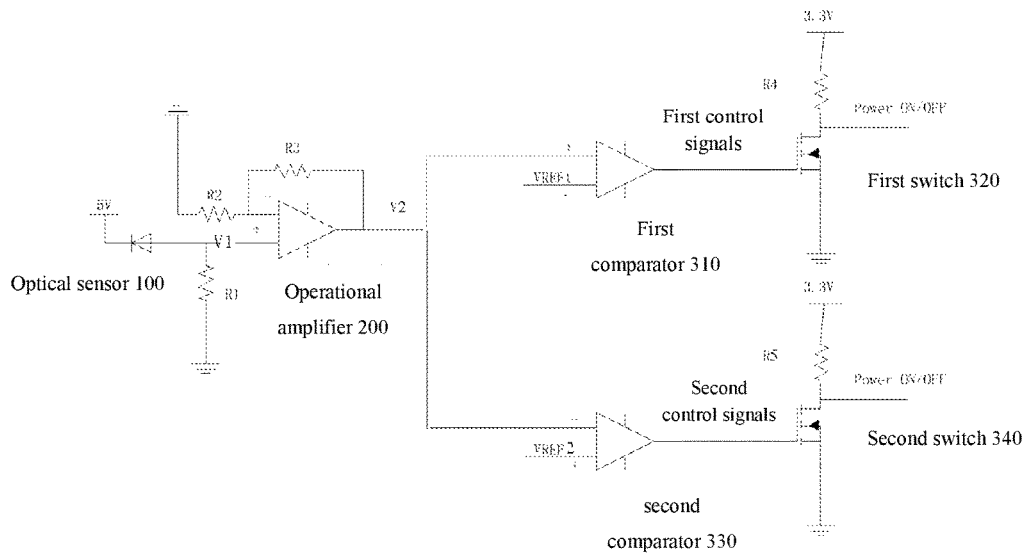
FIG. 4 is a circuit diagram of the detection circuit of the liquid crystal panel in accordance with one embodiment.

FIG. 4 is a circuit diagram of the detection circuit of the liquid crystal panel in accordance with one embodiment.

As shown in FIG. 4, the comparison circuit 300 includes the first comparator 310, the first switch 320, the second comparator 330, and the second switch 340. Specifically, one end of the optical sensor 100 connects to a 5V voltage, and the other end of the optical sensor 100 connects to a forward input end of the operational amplifier 200, and a backward input end of the operational amplifier 200 connects to one end of a resistor (R2), and the other end of the resistor (R2) is grounded. The output end of the operational amplifier 200, the forward input end of the first comparator 310, and the backward input end of the first switch 320 are connected in parallel. The backward input end of the first comparator 310 connects to a first reference voltage (VREF1), the forward input end of the first switch 320 connects to a second reference voltage (VREF2), an output end of the first comparator 310 connects to a source of the first switch 320, the output end of the second comparator 330 connects to the source of the second switch 340, a drain of the first switch 320 connects to a control end of the power 400, and the drain of the second switch 340 connects to the control end of the power 400.

The operations of the detection circuit of the liquid crystal panel will be described hereinafter.

Specifically, the optical sensor 100 detects a brightness of the liquid crystal panel, and converts the detected brightness into a first voltage (V1). After receiving the first voltage (V1), the operational amplifier 200 amplifies the first voltage (V1) according to a predetermined ratio to generate a second voltage (V2) and respectively outputs the second voltage (V2) to the first comparator 310 and the second comparator 330. The first comparator 310 compares the second voltage (V2) with the first reference voltage (VREF1), wherein when the second voltage (V2) is greater than the first reference voltage (VREF1), it is determined that the brightness of the liquid crystal panel is higher than a normal brightness. Thus, the liquid crystal panel may operate abnormally, such as Gamma drifting or data error. The first comparator 310 generates the first control signals for turning on the first switch 320. The second comparator 330 is turned on upon receiving the first control signals, such as high level signal, such that the enable signals of the power of the liquid crystal panel is grounded and the liquid crystal panel is shut down. Correspondingly, when the second voltage (V2) is smaller than the first reference voltage (VREF1), it is determined that the brightness of the liquid crystal panel is not higher than the normal brightness. Thus, the liquid crystal panel may operate normally. Thus, the first comparator 310 generates the first control signals turning off the first switch 320. Thus, the second switch 320 is in an off-state, and the liquid crystal panel displays the images normally.

In addition, when the first comparator 310 compares the second voltage (V2) with the first reference voltage (VREF1), the second comparator 330 compares the second voltage (V2) with the second reference voltage (VREF2), wherein when the second voltage (V2) is smaller than the second reference voltage (VREF2), it is determined that the brightness of the liquid crystal panel is lower than a normal brightness. Thus, the liquid crystal panel may operate abnormally, such as Gamma drifting or data error. The second comparator 330 generates the second control signals for turning on the second switch 340. The second switch 340 is turned on upon receiving the second control signals, such as high level signal, such that the enable signals of the power of the liquid crystal panel is grounded and the liquid crystal panel is shut down.

Correspondingly, when the second voltage (V2) is greater than the second reference voltage (VREF2), it is determined that the brightness of the liquid crystal panel is not lower than the normal brightness. Thus, the liquid crystal panel may operate normally. Thus, the second comparator 330 generates the second control signals turning off the second switch 340. Thus, the second switch 340 is in an off-state, and the liquid crystal panel displays the images normally.

It is to be noted that the second reference voltage (VREF2) is greater than the first reference voltage (VREF1), and only one of the first comparator 310 and the second comparator 330 may generate the control signals for turning on the corresponding switch.

In view of the above, with respect to the detection circuit, the power of the liquid crystal panel may be shut down in time when the liquid crystal panel operates abnormally, which avoids more serious issue that may occur.

Figure 5:
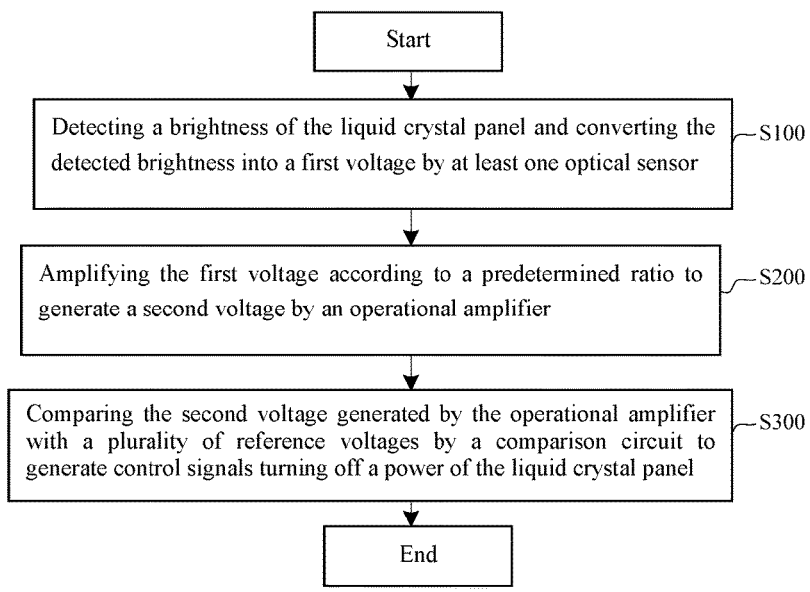
FIG. 5 is a flowchart illustrating the detection method of the liquid crystal panels in accordance with one embodiment.

FIG. 5 is a flowchart illustrating the detection method of the liquid crystal panels in accordance with one embodiment.

As shown in FIG. 5, in step S100, detecting a brightness of the liquid crystal panel and converting the detected brightness into a first voltage by at least one optical sensor 100. Specifically, the optical sensor 100 converts the optical signals indicative of the brightness of the liquid crystal panel into the first voltage, and inputs the first voltage to the operational amplifier 200.

In step S200, amplifying the first voltage according to a predetermined ratio to generate a second voltage by an operational amplifier 200.

In step S300, comparing the second voltage generated by the operational amplifier 200 with a plurality of reference voltages by a comparison circuit 300 to generate control signals turning off a power 400 of the liquid crystal panel.

Specifically, when the liquid crystal panel operates abnormally, the operational voltage of the liquid crystal panel may be abnormal also. Thus, the operations of the liquid crystal panel may be conceived by comparing the current operational voltage with the predetermined voltage.

The process regarding how the second voltage is compared with the reference voltages to generate the shutdown signals will be described hereinafter.

In one example, the first comparator 310 compares the second voltage with the first reference voltage, and the first switch 320 may be turned on or off by the first control signals outputted by the first comparator 310. The second comparator 330 compares the second voltage with the second reference voltage, and the second switch 340 may be turned on or off by the second control signals outputted by the second comparator 330.

The second reference voltage is greater than the first reference voltage. When the first switch 320 is turned on by the first control signals or the second switch 340 is turned on by the second control signals, the power of the liquid crystal panel is turned off for the reason that the first switch 320 or the second switch 340 is turned on.

Specifically, when the second voltage is greater than the first reference voltage, the first comparator 310 outputs the first control signals to turn on the first switch 320. Specifically, when the second voltage is smaller than the first reference voltage, the first comparator 310 outputs the first control signals to turn off the first switch 320. Specifically, when the second voltage is smaller than the second reference voltage, the second comparator 330 outputs the second control signals to turn on the second switch 340. When the second voltage is greater than the second reference voltage, the second comparator 330 outputs the second control signals to turn off the second switch 340. That is, when one of the first switch 320 and the second switch 340 is turned on, enable signals of the switches of the liquid crystal panel may be grounded so as to turn off the power 400 of the liquid crystal panel.

In one example, the third comparator 350 may compare the second voltage with the third reference voltage, and the fourth comparator 360 may compare the second voltage with the fourth reference voltage. The OR circuit 370 executes or calculates the third control signals outputted by the third comparator 350 and the fourth control signals outputted by the fourth comparator 360 to generate fifth control signals. The third switch 380 may be turned on or off by the fifth control signals outputted by the OR circuit 370.

The fourth reference voltage is greater than the third reference voltage. When the fifth control signals turns on the third switch 380, the power 400 of the liquid crystal panel may be turned off when the third switch 380 is turned on.

Specifically, when the second voltage is greater than the third reference voltage, the third control signals outputted by the third comparator 350 turns on the third switch 380. Specifically, when the second voltage is smaller than the third reference voltage, the third control signals outputted by the third comparator 350 turns off the third switch 380. When the second voltage is smaller than the fourth reference voltage, the fourth control signals outputted by the fourth comparator turns on the third switch 380. When the second voltage is greater than the fourth reference voltage, the fourth control signals outputted by the fourth comparator 360 turns off the third switch 380. That is, when one of the third control signals and the fourth control signals turns on the OR circuit 370, the OR circuit 370 generates the fifth control signals to turn on the third switch 380. As such, the enable signals of the switches of the liquid crystal panel may be grounded to shut down the power 400 of the liquid crystal panel.

In view of the above, with respect to the detection circuit, the power of the liquid crystal panel may be shut down in time when the liquid crystal panel operates abnormally, which avoids more serious issue that may occur.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A detection circuit of liquid crystal panels, comprising:
   at least one optical sensor configured to detect brightness of a liquid crystal panel, and to convert the detected brightness into a first voltage;
   an operational amplifier configured to amplify the first voltage according to a predetermined ratio to generate a second voltage; and
   a comparison circuit configured to compare the second voltage generated by the operational amplifier with a plurality of reference voltages to generate control signals for shutting down power of the liquid crystal panel;
   wherein the comparison circuit comprises:
   a first comparator that is configured to compare the second voltage with a first reference voltage;
   a first switch that is turned on or off in accordance with first control signals outputted by the first comparator;
   a second comparator that is configured to compare the second voltage with a second reference voltage;
   a second switch that is turned on or off in accordance with second control signals outputted by the second comparator; and
   wherein the second reference voltage is greater than the first reference voltage, and the power of the liquid crystal panel is turned off when the first switch is turned on by the first control signals or when the second switch is turned on by the second control signals.

2. The detection circuit as claimed in claim 1, wherein when the second reference voltage is greater than the first reference voltage, the first switch is turned on by the first control signals outputted by the first comparator, and when the second reference voltage is smaller than the first reference voltage, the first switch is turned off by the first control signals outputted by the first comparator; and
   when the second reference voltage is smaller than the second reference voltage, the second switch is turned on by the second control signals outputted by the second comparator, and when the second reference voltage is greater than the second reference voltage, the second switch is turned off by the second control signals outputted by the second comparator.

3. A detection method of liquid crystal panels, comprising:
   detecting brightness of a liquid crystal panel and converting the detected brightness into a first voltage by at least one optical sensor;
   amplifying the first voltage according to a predetermined ratio to generate a second voltage by an operational amplifier; and
   comparing the second voltage generated by the operational amplifier with a plurality of reference voltages by a comparison circuit to generate control signals turning off power of the liquid crystal panel;

wherein the step of comparing the second voltage generated by the operational amplifier with a plurality of reference voltages by a comparison circuit to generate control signals turning off power of the liquid crystal panel further comprises:

comparing the second voltage with a first reference voltage, and turning on or off a first switch by first control signals outputted by a first comparator; and comparing the second voltage with a second reference voltage, and turning on or off a second switch by second control signals outputted by a second comparator; and wherein the second reference voltage is greater than the first reference voltage, and the power of the liquid crystal panel is turned off when the first switch is turned on by the first control signals or when the second switch is turned on by the second control signals.

4. The detection method as claimed in claim 3, wherein when the second reference voltage is greater than the first reference voltage, the first switch is turned on by the first control signals outputted by the first comparator, and when the second reference voltage is smaller than the first reference voltage, the first switch is turned off by the first control signals outputted by the first comparator; and when the second reference voltage is smaller than the second reference voltage, the second switch is turned on by the second control signals outputted by the second comparator, and when the second reference voltage is greater than the second reference voltage, the second switch is turned off by the second control signals outputted by the second comparator.

5. A detection method of liquid crystal panels, comprising:

detecting brightness of a liquid crystal panel and converting the detected brightness into a first voltage by at least one optical sensor;

amplifying the first voltage according to a predetermined ratio to generate a second voltage by an operational amplifier; and comparing the second voltage generated by the operational amplifier with a plurality of reference voltages by a comparison circuit to generate control signals turning off power of the liquid crystal panel;

wherein the step of comparing the second voltage generated by the operational amplifier with a plurality of reference voltages by a comparison circuit to generate control signals turning off power of the liquid crystal panel further comprises:

comparing the second voltage with a third reference voltage by a third comparator;

comparing the second voltage with a fourth reference voltage by a fourth comparator; and executing or calculating third control signals outputted by the third comparator and fourth control signals outputted by the fourth comparator to generate fifth control signals by an OR circuit; and turning off a third switch by fifth control signals outputted by the OR circuit; and wherein the fourth reference voltage is greater than the third reference voltage, and when the fifth control signals turn on the third switch, the power of the liquid crystal panel is turned off when the third switch is turned on.

6. The detection method as claimed in claim 5, wherein when the second reference voltage is greater than the third reference voltage, the third switch is turned on by the third control signals outputted by the third comparator, and when the second reference voltage is smaller than the third reference voltage, the third switch is turned off by the third control signals outputted by the third comparator; and when the second reference voltage is smaller than the fourth reference voltage, the third switch is turned on by the fourth control signals outputted by the fourth comparator, and when the second reference voltage is greater than the fourth reference voltage, the third switch is turned off by the fourth control signals outputted by the fourth comparator.

7. A detection circuit of liquid crystal panels, comprising:

at least one optical sensor configured to detect brightness of a liquid crystal panel, and to convert the detected brightness into a first voltage;

an operational amplifier configured to amplify the first voltage according to a predetermined ratio to generate a second voltage; and a comparison circuit configured to compare the second voltage generated by the operational amplifier with a plurality of reference voltages to generate control signals for shutting down power of the liquid crystal panel;

wherein the comparison circuit further comprises:

a third comparator that compares the second voltage with a third reference voltage;

a fourth comparator that compares the second voltage with a fourth reference voltage;

an OR circuit that executes or calculates the third control signals outputted by the third comparator and the fourth control signals outputted by the fourth comparator to generate fifth control signals; and a third switch that is turned on or off by the fifth control signals outputted by the OR circuit; and wherein the fourth reference voltage is greater than the third reference voltage, and when the fifth control signals turns on the third switch, the power of the liquid crystal panel is turned off when the third switch is turned on.

8. The detection circuit as claimed in claim 7, wherein when the second reference voltage is greater than the third reference voltage, the third switch is turned on by the third control signals outputted by the third comparator, and when the second reference voltage is smaller than the third reference voltage, the third switch is turned off by the third control signals outputted by the third comparator; and when the second reference voltage is smaller than the fourth reference voltage, the third switch is turned on by the fourth control signals outputted by the fourth comparator, and when the second reference voltage is greater than the fourth reference voltage, the third switch is turned off by the fourth control signals outputted by the fourth comparator.

* * * * *